United States Patent
Ishida et al.

(10) Patent No.: US 11,383,306 B2
(45) Date of Patent: Jul. 12, 2022

(54) METHOD FOR PRODUCING POLYCRYSTALLINE DIAMOND BODY, POLYCRYSTALLINE DIAMOND BODY, CUTTING TOOL, WEAR-RESISTANCE TOOL AND GRINDING TOOL

(71) Applicant: Sumitomo Electric Industries, Ltd., Osaka (JP)

(72) Inventors: Yuh Ishida, Itami (JP); Hitoshi Sumiya, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 142 days.

(21) Appl. No.: 15/769,378

(22) PCT Filed: Sep. 12, 2017

(86) PCT No.: PCT/JP2017/032795
§ 371 (c)(1),
(2) Date: Apr. 19, 2018

(87) PCT Pub. No.: WO2018/066319
PCT Pub. Date: Apr. 12, 2018

(65) Prior Publication Data
US 2018/0304378 A1    Oct. 25, 2018

(30) Foreign Application Priority Data

Oct. 7, 2016    (JP) .............................. JP2016-199432

(51) Int. Cl.
*B23B 27/20*    (2006.01)
*C01B 32/26*    (2017.01)
(Continued)

(52) U.S. Cl.
CPC .............. *B23B 27/20* (2013.01); *B23B 27/14* (2013.01); *B23B 51/00* (2013.01); *B23C 5/16* (2013.01);
(Continued)

(58) Field of Classification Search
CPC ......... B23B 27/14; B23B 27/20; B23B 51/00; C01B 32/26; B23C 5/16; B23D 77/00;
(Continued)

(56) References Cited

U.S. PATENT DOCUMENTS 7,172,745 B1 *   2/2007   Sung ........................ B01J 3/062
                                                         423/446
9,574,080 B1 *   2/2017   Street ...................... C08L 63/00
(Continued)

FOREIGN PATENT DOCUMENTS

EP          1704913 A1      9/2006
JP          62-271604 A    11/1987
(Continued)

OTHER PUBLICATIONS

Bundy, "Direct Conversion of Graphite to Diamond in Static Pressure Apparatus," Journal of Chemical Physics, vol. 38, No. 3, 1963, pp. 631-643 [Cited in Spec].
(Continued)

*Primary Examiner* — Pegah Parvini
*Assistant Examiner* — Ross J Christie
(74) *Attorney, Agent, or Firm* — Baker Botts L.L.P.; Michael A. Sartori

(57) ABSTRACT

Provided is a method for producing a polycrystalline diamond body, the method including a first step of heat-treating a powder of high-pressure-phase carbon at higher than or equal to 1300° C. to obtain a heat-treated carbon powder, and a second step of sintering the heat-treated carbon powder under conditions of greater than or equal to 12 GPa
(Continued)

and less than or equal to 25 GPa and higher than or equal to 1200° C. and lower than or equal to 2300° C. to obtain a polycrystalline diamond body.

5 Claims, 1 Drawing Sheet

(51) Int. Cl.
| | |
|---|---|
| *C04B 35/52* | (2006.01) |
| *B23B 51/00* | (2006.01) |
| *C04B 35/645* | (2006.01) |
| *B23F 21/00* | (2006.01) |
| *B23C 5/16* | (2006.01) |
| *B23D 77/00* | (2006.01) |
| *C04B 35/626* | (2006.01) |
| *B24D 3/00* | (2006.01) |
| *B23G 5/06* | (2006.01) |
| *C04B 35/528* | (2006.01) |
| *B23B 27/14* | (2006.01) |

(52) U.S. Cl.
CPC .............. *B23D 77/00* (2013.01); *B23F 21/00* (2013.01); *B23G 5/06* (2013.01); *B24D 3/00* (2013.01); *C01B 32/26* (2017.08); *C04B 35/522* (2013.01); *C04B 35/528* (2013.01); *C04B 35/62675* (2013.01); *C04B 35/645* (2013.01); *C01P 2004/51* (2013.01); *C01P 2004/54* (2013.01); *C01P 2004/64* (2013.01); *C04B 2235/425* (2013.01); *C04B 2235/427* (2013.01); *C04B 2235/528* (2013.01); *C04B 2235/5436* (2013.01); *C04B 2235/5445* (2013.01); *C04B 2235/5454* (2013.01); *C04B 2235/5463* (2013.01); *C04B 2235/781* (2013.01); *C04B 2235/80* (2013.01); *C04B 2235/96* (2013.01)

(58) Field of Classification Search
CPC .. B23F 21/00; B23G 5/06; B24D 3/00; C04B 35/522; C04B 35/528; C04B 35/62675; C04B 35/645; C04B 2235/425; C04B 2235/427; C04B 2235/528; C04B 2235/5436; C04B 2235/5445; C04B 2235/5454; C04B 2235/5463; C04B 2235/781; C04B 2235/80; C04B 2235/96; C01P 2004/51; C01P 2004/54; C01P 2004/64

See application file for complete search history.

(56) References Cited

U.S. PATENT DOCUMENTS

| | | | | |
|---|---|---|---|---|
| 2004/0033188 | A1* | 2/2004 | Yamanaka | C09K 3/1409 423/446 |
| 2007/0009374 | A1* | 1/2007 | Akaishi | C04B 35/52 419/48 |
| 2011/0020163 | A1* | 1/2011 | Nilen | C22C 26/00 419/10 |
| 2014/0170055 | A1* | 6/2014 | Ikeda | C01B 32/25 423/446 |
| 2015/0008047 | A1* | 1/2015 | DiGiovanni | E21B 10/567 175/428 |
| 2015/0274533 | A1* | 10/2015 | Arimoto | C04B 35/52 428/408 |
| 2015/0321317 | A1* | 11/2015 | Ishida | C01B 32/25 51/307 |
| 2017/0333998 | A1* | 11/2017 | Sumiya | B23B 27/20 |

FOREIGN PATENT DOCUMENTS

| | | |
|---|---|---|
| JP | 63-079757 A | 4/1988 |
| JP | H04-074766 A | 3/1992 |
| JP | H04-114966 A | 4/1992 |
| JP | 2011-520031 A | 7/2011 |
| JP | 2015-227278 A | 12/2015 |
| WO | 2009/128034 A1 | 10/2009 |
| WO | 2015/025757 A1 | 2/2015 |
| WO | WO-2015140230 A1 * 9/2015 ......... B24D 18/0009 |

OTHER PUBLICATIONS

Wakatsuki et al., "Notes on Compressible Gasket and Bridgman-Anvil Type High Pressure Apparatus," Japanese Journal of Applied Physics, vol. 11, No. 4, 1972, pp. 578-590 [Cited in Spec].
Naka et al., "Direct Conversion of graphite to diamond under static pressure," Nature, vol. 259, 1976, pp. 38-39 [Cited in Spec].
Irifune et al., "Nature of Polycrystalline Diamond Synthesized by Direct Conversion of Graphite Using Kawai-Type Multianvil Apparatus," New Diamond and Frontier Carbon Technology, vol. 14, No. 5, 2004, pp. 313-327 [Cited in Spec].
Sumiya et al., "Synthesis of High-Purity Nano-Polycrystalline Diamond and Its Characterization," SEI Technical Review, No. 165, 2004, pp. 68-74 [Cited in Spec].
Sumiya et al., "Synthesis of High-Purity Nano-Polycrystalline Diamond and Its Characterization," SEI Technical Review, No. 59, 2005, pp. 52-59 (English version of NPL5).
Sumiya, Hitoshi, et al., "Microstructure and Mechanical Properties of High-Hardness Nano-Polycrystalline Diamonds," SEI Technical Review, vol. 66, Apr. 1, 2008, pp. 85-91. [CCited in Office Action dated Jun. 12, 2019 in counterpart application EP3351520].
Notification of the First Office Action issued in counterpart Chinese Patent Application No. 201780003904.1 dated Jun. 3, 2020.
Zou et al., "Additive-free synthesis of polycrystalline diamond compact," China Science and Technology Paper Online, Website: http:www.paper.edu.cn/releasepaper/content/201301-778, pp. 1-11 [Cited in OA, w/Abstract].

* cited by examiner

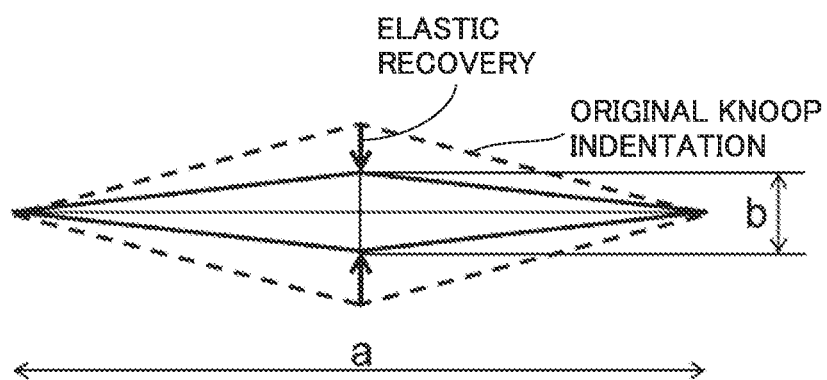

METHOD FOR PRODUCING POLYCRYSTALLINE DIAMOND BODY, POLYCRYSTALLINE DIAMOND BODY, CUTTING TOOL, WEAR-RESISTANCE TOOL AND GRINDING TOOL

TECHNICAL FIELD

The present invention relates to a method for producing a polycrystalline diamond body, a polycrystalline diamond body, a cutting tool, a wear-resistance tool and a grinding tool. The present application claims priority based on Japanese Patent Application No. 2016-199432 filed on Oct. 7, 2016. The disclosure of the Japanese patent application is incorporated herein by reference in its entirety.

BACKGROUND ART

For a sintered diamond body to be used in a conventional diamond tool, a metal such as cobalt (Co), and a ceramic such as silicon carbide (SiC) are used as a sintering aid and a binding material. In addition, for example, Japanese Patent Application Laying-Open Nos. 4-074766 (PTD 1) and 4-114966 (PTD 2) disclose a method using a carbonate as a sintering aid. Such a diamond sintered body is obtained by sintering a diamond powder together with a sintering aid and a binding material under high-temperature and high-pressure conditions where diamond is thermodynamically stable (normally at a pressure of 5 to 8 GPa and a temperature of 1300 to 2200° C.). On the other hand, naturally occurring polycrystalline diamond bodies (carbononados and ballasts) are also known, and used as drill bits in some cases, but these polycrystalline diamond bodies are rarely used on an industrial scale because of their large variation in material quality and low quantity of output.

On the other hand, there is a method (direct conversion-sintering method) in which non-diamond carbon such as graphite or amorphous carbon is converted directly into diamond, and simultaneously sintered at an ultra-high pressure and high temperature without using a catalyst and/or a solvent. For example, J. Chem. Phys., 38 (1963) pp. 631-643 (NPD 1), Japan. J. Appl. Phys., 11 (1972) pp. 578-590 (NPD 2) and Nature 259 (1976) pp. 38-39 (NPD 3) disclose that a polycrystalline diamond body is obtained with graphite as a starting substance at an ultra-high pressure and high temperature of 14 to 18 GPa and greater than or equal to 3000 K.

Further, New Diamond and Frontier Carbon Technology, 14 (2004) pp. 313-327 (NPD 4) and SEI Technical Review 165 (2004) pp. 68-74 (NPD 5) disclose a method in which with high-purity graphite as a raw material, a dense highly-purity polycrystalline diamond body is obtained using a direct conversion-sintering method through indirect heating at an ultra-high pressure and high temperature of greater than or equal to 12 GPa and higher than or equal to 2200° C.

CITATION LIST

Patent Document

PTD 1: Japanese Patent Laying-Open No. 4-074766
PTD 2: Japanese Patent Laying-Open No. 4-114966

Non Patent Document

NPD 1: J. Chem. Phys., 38 (1963) pp. 631-643
NPD 2: Japan. J. Appl. Phys., 11 (1972) pp. 578-590
NPD 3: Nature 259 (1976) pp. 38-39
NPD 4: New Diamond and Frontier Carbon Technology, 14 (2004) pp. 313-327
NPD 5: SEI Technical Review 165 (2004) pp. 68-74

SUMMARY OF INVENTION

A method for producing a polycrystalline diamond body according to one aspect of the present invention includes a first step of heat-treating a powder of high-pressure-phase carbon at higher than or equal to 1300° C. to obtain a heat-treated carbon powder, and a second step of sintering the heat-treated carbon powder under conditions of greater than or equal to 12 GPa and less than or equal to 25 GPa and higher than or equal to 1200° C. and lower than or equal to 2300° C. to obtain a polycrystalline diamond body.

A polycrystalline diamond body according to one aspect of the present invention includes diamond, the diamond has an average particle size of less than or equal to 15 nm, and a ratio b/a of a length b of a shorter diagonal line with respect to a length a of a longer diagonal line of a Knoop indentation is less than or equal to 0.05 in Knoop hardness measurement with a test load of 4.9 N at 23° C.±5° C.

A cutting tool, a wear-resistance tool and a grinding tool according to one aspect of the present invention includes the polycrystalline diamond body.

BRIEF DESCRIPTION OF DRAWINGS

FIG. 1 is an explanatory view illustrating a Knoop indentation.

DESCRIPTION OF EMBODIMENTS

Problem to be Solved by the Present Disclosure

However, a polycrystalline diamond body obtained using a sintering aid as described in Patent Literatures 1 and 2 is poor in heat resistance because the sintering aid used is included in the polycrystalline body, and the sintering aid acts as a catalyst that promotes graphitization of diamond. In addition, when heat is applied to a polycrystalline diamond body obtained using a sintering aid, fine cracks are easily generated due to a difference in thermal expansion between the sintering aid and diamond, leading to deterioration of mechanical characteristics.

A method is known in which a metal at a grain boundary of diamond particles is removed for improving the heat resistance of a polycrystalline diamond body, and by this method, the heat-resistant temperature is increased to about 1200° C., but the polycrystalline body is made porous, so that the strength is further reduced. In addition, a polycrystalline diamond body obtained using SiC as a binding material is excellent in heat resistance, but has a low strength because there is no bond between diamond particles.

In addition, in production of each of polycrystalline diamond bodies in NPDs 1, 2 and 3, a direct electrical heating method in which conductive non-diamond carbon such as graphite is heated by feeding a current directly the non-diamond carbon. Thus, a polycrystalline diamond body obtained by such a method has insufficient hardness and strength because non-diamond carbon such as graphite remains, and further, the diamond has an uneven crystal grain size.

In addition, when the sintering temperature is decreased for obtaining a polycrystalline diamond body having a small particle size as in ultra-precision processing, in production of each of polycrystalline diamond bodies in NPDs 4 and 5, sinterability is deteriorated, so that the strength of the polycrystalline body is reduced. In addition, when the particle size of diamond particles decreases, toughness is reduced, so that the tool is easily chipped.

Thus, an object of the present invention is solve the above-described problems and to provide a method for producing a polycrystalline diamond body, which is capable of producing a tough polycrystalline diamond body having fine structures, a polycrystalline diamond body, a cutting tool, a wear-resistance tool and a grinding tool.

Advantageous Effect of the Present Disclosure

Accordingly, there can be provided a method for producing a polycrystalline diamond body, which is capable of producing a tough polycrystalline diamond body having fine structures, a polycrystalline diamond body, a cutting tool, a wear-resistance tool and a grinding tool.

DESCRIPTION OF EMBODIMENTS

First, embodiments of the present invention will be listed and described.

[1] A method for producing a polycrystalline diamond body according to one aspect of the present invention includes a first step of heat-treating a powder of high-pressure-phase carbon at higher than or equal to 1300° C. to obtain a heat-treated carbon powder, and a second step of sintering the heat-treated carbon powder under conditions of greater than or equal to 12 GPa and less than or equal to 25 GPa and higher than or equal to 1200° C. and lower than or equal to 2300° C. to obtain a polycrystalline diamond body. With such a configuration, a tough polycrystalline diamond body having fine structures can be produced.

[2] In the first step, the powder of high-pressure-phase carbon can be heat-treated at lower than or equal to 2100° C. Accordingly, a tough polycrystalline diamond body having fine structures can be efficiently produced.

[3] The high-pressure-phase carbon may include at least one of diamond and hexagonal diamond. Accordingly, a tough polycrystalline diamond body having fine structures can be efficiently produced.

[4] The method for producing a polycrystalline diamond body includes a first step of heat-treating a powder of high-pressure-phase carbon at higher than or equal to 1300° C. and lower than or equal to 2100° C. to obtain a heat-treated carbon powder, and a second step of sintering the heat-treated carbon powder under conditions of greater than or equal to 12 GPa and less than or equal to 25 GPa and higher than or equal to 1200° C. and lower than or equal to 2300° C. to obtain a polycrystalline diamond body. The high-pressure-phase carbon may include at least one of diamond and hexagonal diamond. Accordingly, a tough polycrystalline diamond body having fine structures can be further efficiently produced.

[5] A polycrystalline diamond body according to one aspect of the present invention includes diamond, the diamond has an average particle size of less than or equal to 15 nm, and a ratio b/a of a length b of a shorter diagonal line with respect to a length a of a longer diagonal line of a Knoop indentation is less than or equal to 0.05 in Knoop hardness measurement with a test load of 4.9 N at 23° C.±5° C. With such a configuration, the polycrystalline diamond body has fine structures, and is tough.

[6] In the Knoop hardness measurement, a Knoop hardness may be greater than or equal to 100 GPa and less than or equal to 140 GPa. Accordingly, a tougher polycrystalline diamond body having fine structures is obtained.

[7] A cutting tool according to one aspect of the present invention includes the polycrystalline diamond body. Accordingly, a cutting tool including a tougher polycrystalline diamond body having fine structures is obtained. The cutting tool is useful for cutting various kinds of materials.

[8] A wear-resistance tool according to one embodiment of the present invention includes the polycrystalline diamond body. Accordingly, a wear-resistance tool including a tougher polycrystalline diamond body having fine structures is obtained. The wear-resistance tool is useful for processing various kinds of materials.

[9] A grinding tool according to one aspect of the present invention includes the polycrystalline diamond body. Accordingly, a grinding tool including a tougher polycrystalline diamond body having fine structures is obtained. The grinding tool is useful for grinding various kinds of materials.

DETAILS OF EMBODIMENTS OF INVENTION

Hereinafter, embodiments of the present invention (hereinafter, also referred to as "the present embodiment") will be described more in detail. Here, unless an atom ratio is not particularly limited when a compound or the like is represented by a chemical formula in this specification, the compound has any previously known atom ratio, and the atom ratio is not necessarily limited to one in a stoichiometric range. In this specification, the "particle size" means an average particle size unless otherwise specified.

Embodiment 1: Method for Producing Polycrystalline Diamond Body

The present inventors have extensively conducted studies, and resultantly found that when a powder of high-pressure-phase carbon is heat-treated at a predetermined temperature to obtain a heat-treated carbon powder, and with the heat-treated carbon powder as a starting substance, the heat-treated carbon powder is converted into diamond, and sintered, a tough polycrystalline diamond body having fine structures is obtained, leading to completion of the present invention.

That is, the method for producing a polycrystalline diamond body according to the present embodiment includes a first step of heat-treating a powder of high-pressure-phase carbon at higher than or equal to 1300° C. to obtain a heat-treated carbon powder, and a second step of sintering the heat-treated carbon powder under conditions of greater than or equal to 12 GPa and less than or equal to 25 GPa and higher than or equal to 1200° C. and lower than or equal to 2300° C. to obtain a polycrystalline diamond body. The polycrystalline diamond body obtained by the production method includes diamond having a very small particle size, and is tough.

Here, in this specification, the "high-pressure-phase carbon" refers to thermodynamically stable or metastable carbon under high pressure. Specifically, the "high-pressure-phase carbon" refers to carbon that is thermodynamically stable or metastable within a diamond-stable region, i.e., a region with a higher pressure with respect to a graphite-diamond equilibrium line, in P (pressure)-T (temperature) phase diagram commonly known for carbon. More specifically, the "high-pressure-phase carbon" refers to diamond, hexagonal diamond and compressed graphite.

Diamond has a cubic crystal structure in which carbon atoms are mutually bonded through an $sp^3$ hybrid orbital, and all six-membered rings formed by carbon atoms have a chair conformation. Hexagonal diamond is also called Lonsdaleite, and has a hexagonal crystal structure in which carbon atoms are mutually bonded through an $sp^3$ hybrid orbital, some of six-membered rings formed by carbon atoms have a boat conformation, and others have a chair conformation. Compressed graphite has a hexagonal crystal structure in which carbon atoms are mutually bonded through an $sp^2$ hybrid orbital as with normal graphite (i.e., graphite that is not subjected to the above-mentioned heat treatment, and belongs to ordinary-pressure-phase carbon as described later), but the crystal structure of the compressed graphite is compressed in a c-axis direction with the (002) plane spacing (d value) being less than or equal to 98%, a value that is smaller as compared to normal graphite.

On the other hand, the later-described "ordinary-pressure-phase carbon" refers to thermodynamically stable or metastable carbon under ordinary pressure. Specifically, the "ordinary-pressure-phase carbon" refers to carbon that is stable or metastable within a graphite-stable region, i.e., a region with a lower pressure with respect to a graphite-diamond equilibrium line, in the P-T phase diagram for carbon. More specifically, graphite (normal graphite above), graphene, fullerene, carbon nanotubes, glassy carbon, amorphous carbon and the like belong to the ordinary-pressure-phase carbon.

<First Step>

The first step is a heat treatment step of heat-treating a high-pressure-phase carbon (e.g., at least one of diamond, hexagonal diamond and compressed graphite) powder at higher than or equal to 1300° C. to obtain a heat-treated carbon powder. In the first step, the high-pressure-phase carbon powder is heat-treated at higher than or equal to 1300° C. to convert high-pressure-phase carbon into ordinary-pressure-phase carbon (hereinafter, also referred to as "ordinary-pressure-phase carbon after heat treatment"), so that a heat-treated carbon powder (i.e., a powder that is an aggregation of particles of the ordinary-pressure-phase carbon after heat treatment) is obtained.

The heat-treated carbon is ordinary-pressure-phase carbon formed by the heat treatment, and has a spherical shape or a polyhedral shape having rounded vertexes unlike normal ordinary-pressure-phase carbon (i.e., ordinary-pressure-phase carbon that is not subjected to the heat treatment; the same applies hereinafter). Further, since the heat-treated carbon has the spherical or polyhedral shape as described above, and has substantially no dangling bond, atmospheric components such as oxygen and moisture are more hardly adsorbed to the heat-treated carbon than to normal ordinary-pressure-phase carbon. Thus, quality of the heat-treated carbon powder is more easily controlled as compared to the normal ordinary-pressure-phase carbon, and therefore a tough polycrystalline diamond body having fine structures can be efficiently produced by passing through a second step as described later.

The high-pressure-phase carbon powder may contain ordinary-pressure-phase carbon and impurities other than carbon as long as suitable heat-treated carbon can be obtained by heat treatment. From the viewpoint of obtaining suitable heat-treated carbon, the content of the ordinary-pressure-phase carbon is preferably less than or equal to 5% by volume, and the content of the impurities other than carbon is preferably less than or equal to 1% by volume.

In the first step, the particle size of the high-pressure-phase carbon powder is not particularly limited, but is greater than or equal to 10 nm and less than or equal to 10 mm for the sake of production. The heat treatment temperature varies depending on a particle size of the high-pressure-phase carbon, and the smaller the particle size, the lower the heat treatment temperature, but at a temperature lower than 1300° C., high-pressure-phase carbon is not converted into the ordinary-pressure-phase carbon after heat treatment regardless of the particle size. Depending on a heat treatment temperature, the heat-treated carbon has a spherical shape, or a rounded polyhedral shape. Since heat-treated carbon subjected to heat treatment at a temperature higher than 2100° C. has a structure close to that of normal graphite structure, and undergoes grain growth, the heat treatment temperature is preferably 2100° C. or lower. The particle size of heat-treated carbon subjected to heat treatment at higher than or equal to 1300° C. and lower than or equal to 2100° C. is almost the same as the particle size of high-pressure-phase carbon.

In addition, it is preferable to perform the heat treatment in an atmosphere having a reduced amount of oxygen or in an atmosphere free from oxygen, such as a vacuum atmosphere or an argon atmosphere. When the heat treatment is performed in an atmosphere having a large amount of oxygen, such as air, oxygen is adsorbed to the heat-treated carbon. Thus, in the subsequent second step, conversion into diamond is hindered, and the strength of the resulting polycrystalline diamond body is reduced.

The heat treatment time in the first step is not particularly limited, but is preferably greater than or equal to 1 minute from the viewpoint of promoting conversion from the high-pressure-phase carbon to the heat-treated carbon, and preferably less than or equal to 120 minutes (2 hours) from the viewpoint of suppressing graphitization and grain growth.

In addition, in the first step, it is preferable to perform the heat treatment until the high-pressure-phase carbon completely disappears, but a part of the high-pressure-phase carbon may remain in the heat-treated carbon. The permissible residual amount of the high-pressure-phase carbon varies depending on a particle size of diamond of a polycrystalline diamond body to be formed and a particle size of the heat-treated carbon powder. When a polycrystalline diamond body of very small particles having a particle size of less than or equal to several tens nm, the permissive residual amount of the high-pressure-phase carbon is preferably less than or equal to 50% by volume in the case of a heat-treated carbon powder having a particle size of more than 10 nm and less than or equal to 100 nm, preferably less than or equal to 30% by volume in the case of a heat-treated carbon powder having a particle size of more than 100 nm and less than or equal to 5 μm, and preferably less than or equal to 10% by volume in the case of a heat-treated carbon powder having a particle size of more than 5 μm.

Preferably, the high-pressure-phase carbon includes at least one of diamond and hexagonal diamond. Accordingly, a tough polycrystalline diamond body having fine structures can be efficiently produced.

Here, the allotrope composition of the high-pressure-phase carbon and heat-treated carbon can be determined by an X-ray diffraction method, and for example, an X-ray diffractometer (trade name: "X'pert", manufactured by Spectris) can be used. For example, conditions of the apparatus here may be set as follows.

Characteristic X-ray: Cu-Kα (wavelength: 1.54 angstroms)
Tube voltage: 45 kV
Tube current: 40 mA
Filter: Multilayer mirror
Optical system: intensive method
X-ray diffraction method: θ-2θ method.

The content of the impurities in the high-pressure-phase carbon and the heat-treated carbon can be measured by, for example, secondary ion mass spectrometry (SIMS). When the content of the impurities is measured by SIMS, for example, analysis can be performed under the following conditions.

Measuring apparatus: trade name (product number): "IMS-7f", manufactured by CAMECA
Primary ion species: cesium ($Cs^+$)
Primary acceleration voltage: 15 kV
Detection area: 30 (μmφ)
Measurement accuracy: ±40% (2σ).

The particle size (average particle size) of particles of the high-pressure-phase carbon and the heat-treated carbon can be determined by a cutting method using a scanning electron microscope (SEM) as described below. Specifically, first a randomly selected cross-section of each of the high-pressure-phase carbon and heat-treated carbon particles embedded in a binder resin is observed with a SEM at a magnification of 1000 to 30000, so that a SEM image is obtained.

Next, the particle size of the particles is determined by a cutting method. Specifically, a circle is drawn on the SEM image, and eight straight lines are radially drawn from the center of the circle to the outer circumference of the circle in such a manner that the intersection angles between the straight lines are almost equal to one another. Here, it is preferable that the observation magnification and the diameter of the circle are set so that about 10 to 50 particles (crystal grains) of carbon are placed per the straight line.

Further, the number of carbon particle crystal grain boundaries crossing each straight line is counted, and the length of the straight line is divided by the number of the crossing crystal grain boundaries to determine an average intercept length. Subsequently, a value obtained by multiplying the average intercept length by 1.128 is defined as an average particle size (such a cutting method conforms to a method for calculating a nominal particle size in the ASTM standard).

Preferably, an average particle size of carbon particles is determined for each of three SEM images as described above by the method, and an average of the determined average particle sizes is defined as the average particle size of the high-pressure-phase carbon and the heat-treated carbon. In addition, the shape of crystal grains of the heat-treated carbon can be determined by using the SEM image.

<Second Step>

The second step is a sintering step of sintering the heat-treated carbon powder under conditions of greater than or equal to 12 GPa and less than or equal to 25 GPa and higher than or equal to 1200° C. and lower than or equal to 2300° C. to obtain a polycrystalline diamond body. In the second step, the heat-treated carbon powder subjected to heat treatment in the first step is sintered under conditions of greater than or equal to 12 GPa and less than or equal to 25 GPa and higher than or equal to 1200° C. and lower than or equal to 2300° C., whereby the heat-treated carbon is converted into diamond, and finely divided to obtain a tough polycrystalline diamond body having a very small diamond particle size and fine structures.

In the second step, the sintering pressure and the sintering temperature are required to be greater than or equal to 12 GPa and less than or equal to 25 GPa and higher than or equal to 1200° C. and lower than or equal to 2300° C., respectively. When the sintering pressure is less than 12 GPa, a large amount of unconverted heat-treated carbon remains in the polycrystalline diamond body, and the polycrystalline diamond body tends to fail to satisfy the requirement that the ratio b/a of diagonal line lengths of a Knoop indentation be less than or equal to 0.05 as a physical property of the polycrystalline diamond body as described later. It is not necessary to limit the upper limit of the sintering pressure, but for technical reasons associated with an apparatus (ultra-high-pressure and high-temperature generator), the upper limit of the sintering pressure is 20 GPa. When the sintering temperature is lower than 1200° C., a large amount of unconverted heat-treated carbon remains in the polycrystalline diamond body, and the polycrystalline diamond body tends to fail to satisfy the requirement that the ratio b/a of diagonal line lengths of a Knoop indentation be less than or equal to 0.05 as a physical property of the polycrystalline diamond body as described later. When the sintering temperature is higher than 2300° C., grain growth of diamond progresses, and therefore it tends to be unable to obtain fine structures.

In the second step, the sintering time is preferably greater than or equal to 1 minute and less than or equal to 20 minutes, more preferably greater than or equal to 10 minutes and less than or equal to 20 minutes. When the sintering time is less than 1 minute, sintering is insufficient. Even when the sintering time is more than 20 minutes, there is no difference in a sintered state, thus being disadvantageous from an economic point of view.

The second step is a step of converting the heat-treated carbon powder obtained in the first step into diamond, by sintering the heat-treated carbon powder. In this step, the heat-treated carbon is converted directly into diamond without using a sintering aid and/or a catalyst. Normally, in the second step, conversion into diamond progresses concurrently with sintering.

The polycrystalline diamond body may contain unconverted heat-treated carbon and/or hexagonal diamond as long as the fineness of structures of the polycrystalline diamond body and toughness of the polycrystalline diamond body are not hindered. From the viewpoint of ensuring that the fineness of structures of the polycrystalline diamond body and toughness of the polycrystalline diamond body are not hindered, the content of unconverted heat-treated carbon in the polycrystalline diamond body is preferably less than or equal to 0.5% by volume, more preferably less than or equal to 0.1% by volume. The content of hexagonal diamond in the polycrystalline diamond body is not limited, and the fineness of structures of the polycrystalline diamond body and toughness of the polycrystalline diamond body are maintained regardless of the content of hexagonal diamond in the polycrystalline diamond body.

<<Polycrystalline Diamond Body>>

The polycrystalline diamond body according to the present embodiment includes diamond, the diamond has an average particle size of less than or equal to 15 nm, and a ratio b/a of a length b of a shorter diagonal line with respect to a length a of a longer diagonal line of a Knoop indentation is less than or equal to 0.05 in Knoop hardness measurement with a test load of 4.9 N at 23° C.±5° C. With such a configuration, the polycrystalline diamond body of the present embodiment has fine structures, and is tough owing to the configuration.

The polycrystalline diamond body according to the present embodiment does not substantially contain a binder, a sintering aid, a catalyst and the like. Thus, it is possible to eliminate disadvantages of a conventional sintered diamond body including at least any one of a binder, a sintering aid and a catalyst. The polycrystalline diamond body according to the present embodiment is a sintered body. However, a sintered body is normally intended to contain a binder. Thus, in this specification, the term "polycrystalline body" is used in place of the term "sintered body" for clear discrimination from one containing a binder.

The polycrystalline diamond body may contain impurities other than carbon (C) in a range of not hindering fine structures and toughness as long as the polycrystalline diamond body contains diamond. Examples of the impurities include nitrogen (N), hydrogen (H) and oxygen (O). The content of impurities is preferably such that the content of each component of the impurities is less than 1000 ppma (parts per million atomic), and the total content of these components is less than 2000 ppma. A polycrystalline diamond body in which the total content of impurities is more than 2000 ppma has voids generated in the polycrystalline body by impurities, so that the strength of the polycrystalline diamond body is reduced. Further, when the polycrystalline diamond body obtained in the second step is left standing in the air (i.e., an atmosphere containing oxygen and moisture), the total content of impurities tends to be more than 2000 ppma. For example, when the polycrystalline diamond body is left standing for 1 day under an environment with a relative humidity of greater than or equal to 60% in the air, the total content of impurities is more than 2000 ppma.

The content of impurities can be measured by, for example, secondary ion mass spectrometry (SIMS). When the content of the impurities is measured by SIMS, for example, analysis can be performed under the following conditions.

Measuring apparatus: trade name (product number): "IMS-7f", manufactured by
CAMECA
Primary ion species: cesium ($Cs^+$)
Primary acceleration voltage: 15 kV
Detection area: 30 ($\mu m \varphi$)
Measurement accuracy: ±40% ($2\sigma$).

In addition, the polycrystalline diamond body may contain the ordinary-pressure-phase carbon in a range of not hindering fine structures and toughness. From the viewpoint of not hindering the fine structures and toughness of the polycrystalline diamond body, the content of the ordinary-pressure-phase carbon in the polycrystalline diamond body is preferably less than or equal to 0.5% by volume, more preferably less than or equal to 0.1% by volume.

In addition, the polycrystalline diamond body may contain the hexagonal diamond in a range of not hindering fine structures and toughness. The content of hexagonal diamond in the polycrystalline diamond body is not limited, and the fineness of structures of the polycrystalline diamond body and toughness of the polycrystalline diamond body are maintained regardless of the content of hexagonal diamond in the polycrystalline diamond body.

the compositions of the polycrystalline diamond body and the content of each of the compositions can be determined by an X-ray diffraction method, and measured using, for example, the X-ray diffractometer (trade name: "X'pert", manufactured by Spectris). For example, conditions of the apparatus here may be set as follows.

Characteristic X-ray: Cu-K$\alpha$ (wavelength: 1.54 angstroms)
Tube voltage: 45 kV
Tube current: 40 mA
Filter: Multilayer mirror
Optical system: intensive method
X-ray diffraction method: 0-20 method.

The method for producing a polycrystalline diamond body according to the present embodiment is not particularly limited, but from the viewpoint of efficiently producing a polycrystalline diamond body, the above-described method for producing a polycrystalline diamond body is preferable.

<Diamond>

From the viewpoint of ensuring that the polycrystalline diamond body has fine structures, diamond has an average particle size of less than or equal to 15 nm. From such a viewpoint, it is preferable that diamond has an average particle size of less than or equal to 10 nm. In addition, the average particle size of diamond is preferably as small as possible, and therefore it is necessary to specify the lower limit thereof. However, from the viewpoint discriminating diamond from amorphous carbon, the lower limit of the average particle size of diamond is preferably 1 nm. The polycrystalline diamond body includes diamond, and thus has high hardness and excellent thermal stability and chemical stability. Further, since diamond has a small particle size of less than or equal to 15 nm, the polycrystalline diamond body has dense structures, and is tough, and thus the polycrystalline diamond body can be used in a wide range of applications such as heavy-load applications and/or micromachining applications when used for tools.

The particle size of diamond is preferably uniform from the viewpoint of ensuring that stress concentration does not occur, and high strength is obtained. Thus, it is preferable that particle sizes of diamond show a normal distribution with a small deviation. When diamond has a large particle size deviation or an uneven particle size, stress is concentrated thereon, leading to a reduction in strength. In the present application, the simple term "particle size of diamond" refers to the particle size of crystal grains of diamond that forms the polycrystalline diamond body.

The particle size (average particle size) of diamond can be determined by a cutting method using a SEM or a transmission electron microscope (TEM). Specifically, first a randomly selected cross-section of the polycrystalline diamond body is observed with a SEM or TEM at a magnification of 1000 to 50000 (in the case of SEM) or at a magnification of more than 50000 (in the case of TEM), so that a SEM image or TEM image is obtained. After a circle is drawn on the SEM image or TEM image, the particle size (average particle size) of diamond can be determined in the same manner as in the cutting method in the method for measuring the particle size (average particle size) of particles of the high-pressure-phase carbon and the heat-treated carbon. For diamond, the average particle size is preferably determined for each of three SEM images or TEM images as described above, and an average of the determined average particle sizes is defined as the average particle size of diamond.

<Knoop Hardness>

In the polycrystalline diamond body according to the present embodiment, the ratio b/a of the length b of the shorter diagonal line with respect to the length a of the longer diagonal line of a Knoop indentation is less than or equal to 0.05 in Knoop hardness measurement with a test load of 4.9 N at 23° C.±5° C. Further, in the Knoop hardness measurement, the Knoop hardness is preferably greater than or equal to 100 GPa and less than or equal to 140 GPa.

The Knoop hardness measurement is specified in, for example, JIS Z 2251: 2009, and known as one of indices indicating the hardness of an industrial material. In the Knoop hardness measurement, the hardness of a material to be measured is determined by pressing a Knoop indenter against the material to be measured at a predetermined temperature and a predetermined load (test load).

The Knoop indenter is a diamond indenter having a quadrangular prism shape that has a rhombic bottom surface. In the rhombic bottom surface, the ratio b/a of the length b of the shorter diagonal line with respect to the length a of the longer diagonal line is specified as 0.141. The Knoop indentation means a trace remaining at a position where a Knoop indenter is released immediately after the Knoop indenter is pressed against a material to be measured at the above-mentioned temperature and test load.

As one of the features of the polycrystalline diamond body according to the present embodiment, the ratio b/a (less than or equal to 0.05) in the Knoop indentation is smaller than the ratio b/a (0.141) in the original Knoop indenter. This means that the material to be measured (i.e., the polycrystalline diamond body in the present embodiment) shows an elastic behavior, leading to occurrence of recovery (elastic recovery) in which the indentation elastically returns to its original state.

Hereinafter, the above-mentioned phenomenon will be described with reference to FIG. 1 conceptually showing a Knoop indentation. For example, when the material to be measured does not show elastic recovery at all, the cross-section of the Knoop indenter and the Knoop indentation are identical in shape to each other, and have a rhombic shape shown by a broken line as an "original Knoop indentation" in FIG. 1. On the other hand, in the polycrystalline diamond body according to the present embodiment, elastic recovery easily occurs in a direction shown by the arrow in FIG. 1, and therefore the Knoop indentation in the present embodiment has a rhombic shape shown by the solid line in FIG. 1. That is, as the return in the direction shown by the arrow in FIG. 1 increases, the value of the ratio b/a decreases, and elastic recovery (elastic property) is enhanced as the value of the ratio b/a decreases.

The polycrystalline diamond body according to the present embodiment has a high elastic recovery force because the ratio b/a in the Knoop indentation is less than or equal to 0.05. When elastic recovery is high, toughness is improved, so that the polycrystalline diamond body is tough. As described above, the ratio b/a in the Knoop indentation in the present embodiment can be used as an index indicating the degree of elastic recovery of the polycrystalline diamond body.

In the polycrystalline diamond body according to the present embodiment, the ratio b/a in the Knoop indentation is preferably small because elastic recovery is enhanced as the ratio b/a decreases. Further, when elastic recovery is high, the elastic property is enhanced, so that in the case of cutting in which ultrahigh precision is required, the blade edge is elastically deformed, and therefore a diffraction phenomenon (a so-called iridescent pattern) that causes a problem in processing of a mirror surface and results from cutting traces hardly occurs. In this respect, the ratio b/a is preferably small. Thus, it is not necessary to specify the lower limit of the ratio b/a, but when elastic recovery is excessively high, elastic deformation during processing is increased when the polycrystalline diamond body is used for a tool, so that processability tends to be deteriorated. From such a viewpoint, the lower limit of the ratio b/a is preferably 0.030. In the polycrystalline diamond body according to the present embodiment, the ratio b/a in the Knoop indentation is preferably greater than or equal to 0.04 and less than or equal to 0.05.

In the polycrystalline diamond body according to the present embodiment, the Knoop hardness is preferably greater than or equal to 100 GPa, more preferably greater than or equal to 120 GPa from the viewpoint of exhibiting high hardness, high wear resistance and toughness for maintaining performance as a tool. In addition, the Knoop hardness is preferably less than or equal to 140 GPa because the upper limit of the Knoop hardness is about 140 GPa from the viewpoint of a measurement technique.

<<Cutting Tool, Wear-Resistance Tool and Grinding Tool>>

The polycrystalline diamond body according to the present embodiment is suitably used for a cutting tool, a wear-resistance tool, a grinding tool or the like because diamond crystal grains have a very small particle size, and the polycrystalline diamond body is tough. That is, it is preferable that the cutting tool, the wear-resistance tool and the grinding tool according to the present embodiment each include the above-mentioned polycrystalline diamond body.

Each of the cutting tool, the wear-resistance tool and the grinding tool according to the present embodiment may be composed of the polycrystalline diamond body as a whole, or only part of each of the tools (e.g., the blade edge portion for the cutting tool) may be composed of the polycrystalline diamond body. Further, a coating film may be formed on the surface of each tool.

Examples of the cutting tool according to the present embodiment may include drills, end mills, blade edge-replaceable cutting chips for drills, blade edge-replaceable cutting chips for end mills, blade edge-replaceable cutting chips for milling, blade edge-replaceable cutting chips for turning, metal saws, gear cutting tools, reamers, taps and cutting bites. Examples of the wear-resistance tool according to the present embodiment may include dies, scribers, scribing wheels and dressers. Examples of the grinding tool according to the present embodiment may include grinding whetstones.

EXAMPLES

Hereinafter, the present invention will be described more in detail by way of examples, but the present invention is not limited to the examples.

Examples 1 to 11

1. Preparation of Heat-Treated Carbon Powder

For producing polycrystalline diamond bodies of Examples 1 to 11, heat-treated carbon powders were prepared by the following method. First, high-pressure-phase carbon powders having various compositions and average particle sizes shown in Table 1 were heat-treated by holding the high-pressure-phase carbon powders for 60 minutes (1 hour) in vacuum at temperatures shown in Table 1. In this way, heat-treated carbon powders shown as raw materials A to G in Table 1 were prepared (first step).

2. Preparation of Polycrystalline Diamond Body

Each of the raw materials A to G was placed in a capsule made of a high-melting-point metal (material: tantalum), and held at a temperature and pressure as shown in Table 2 for 20 minutes using an ultra-high-pressure and high-temperature generator, so that each of the raw materials A to G was converted into diamond, and sintered (first step). In this way, the polycrystalline diamond bodies of Examples 1 to 11 were obtained.

TABLE 1

|  | Composition of high-pressure-phase carbon powder (% by volume) | Average particle size of high-pressure-phase carbon powder (nm) | Heat treatment temperature (° C.) | Shape of heat-treated carbon powder | Average particle size of heat-treated carbon powder (nm) |
|---|---|---|---|---|---|
| Raw material A | Diamond (100) | 50 | 1600 | Spherical shape | 50 |
| Raw material B | Diamond (100) | 100 | 1400 | Spherical shape | 100 |
| Raw material C | Diamond (100) | 500 | 1750 | Polyhedral shape | 500 |
| Raw material D | Diamond (100) | 10000 | 2000 | Polyhedral shape | 10000 |
| Raw material E | Hexagonal diamond (100) | 100 | 1600 | Spherical shape | 100 |
| Raw material F | Hexagonal diamond (100) | 10000 | 1850 | Polyhedral shape | 10000 |
| Raw material G | Diamond (50)/hexagonal diamond (50) | 50/100 | 1600 | Spherical shape | 75 |

TABLE 2

|  |  | Synthesis conditions | | | | Average particle size (nm) | Knoop hardness (GPa) | Knoop indentation (ratio b/a) |
|---|---|---|---|---|---|---|---|---|
|  | Raw material | Pressure (GPa) | Temperature (° C.) | Composition (% by volume) | | | | |
|  |  |  |  | Diamond | Graphite |  |  |  |
| Example 1 | A | 25 | 1300 | 100 | 0 | 3 | 120 | 0.035 |
| Example 2 | A | 18 | 1800 | 100 | 0 | 5 | 130 | 0.040 |
| Example 3 | A | 13 | 2200 | 99.9 | 0.1 | 13 | 110 | 0.050 |
| Example 4 | B | 16 | 2000 | 100 | 0 | 10 | 120 | 0.045 |
| Example 5 | B | 13 | 2300 | 100 | 0 | 15 | 120 | 0.041 |
| Example 6 | C | 16 | 2200 | 100 | 0 | 8 | 135 | 0.038 |
| Example 7 | D | 16 | 2200 | 100 | 0 | 8 | 130 | 0.039 |
| Example 8 | E | 16 | 2200 | 100 | 0 | 9 | 130 | 0.042 |
| Example 9 | F | 16 | 2200 | 100 | 0 | 9 | 120 | 0.043 |
| Example 10 | C | 16 | 2000 | 99.5 | 0.5 | 7 | 98 | 0.048 |
| Example 11 | G | 16 | 2200 | 100 | 0 | 8 | 125 | 0.040 |
| Comparative Example 1 | A | 16 | 2400 | 100 | 0 | 50 | 125 | 0.060 |
| Comparative Example 2 | A | 25 | 1150 | 90 | 10 | 2.5 | 90 | 0.098 |
| Comparative Example 3 | Coarse graphite powder | 16 | 2200 | 100 | 0 | 70 | 120 | 0.065 |
| Comparative Example 4 | Carbon nanotubes | 16 | 2200 | 100 | 0 | 8 | 100 | 0.055 |
| Comparative Example 5 | Diamond powder/metal binding material | 7 | 1800 | 100 (excluding binding material) | 0 | 2000 | 60 | 0.111 |

Comparative Examples 1 and 2

Polycrystalline diamond bodies of Comparative Examples 1 and 2 were prepared by the following method. That is, as shown in Table 2, the raw material A was placed in the capsule, and held at a temperature and pressure as shown in Table 2 for 20 minutes using an ultra-high-pressure and high-temperature generator, so that the raw material A was converted into diamond, and sintered. In this way, polycrystalline diamond bodies of Comparative Examples 1 and 2 were obtained.

Here, the compositions of the high-pressure-phase carbon powders used in Examples 1 to 11 and Comparative Examples 1 and 2 were determined by the above-described method, i.e., an X-ray diffraction method using an X-ray diffractometer. Further, the particle sizes of these high-pressure-phase carbon powders were determined by the above-described cutting method using a scanning electron microscope (SEM). The shapes of crystal grains of the heat-treated carbon powders (raw materials A to G) were determined by the above-described method using a SEM image.

Comparative Example 3

A polycrystalline diamond body of Comparative Example 3 was prepared by the following method. First, a commercially available graphite powder having an average particle size of 5 μm (hereinafter, also referred to as a "coarse graphite powder" including powders described in Table 2) was provided as a raw material used in place of the heat-treated carbon powder of each of Examples 1 to 11.

The coarse graphite powder was then placed in a capsule made of a high-melting-point metal, and held at a temperature and pressure as shown in Table 2 for 20 minutes using an ultra-high-pressure and high-temperature generator, so that the coarse graphite powder was converted into diamond, and sintered. In this way, the polycrystalline diamond body of Comparative Example 3 was obtained.

Comparative Example 4

A polycrystalline diamond body of Comparative Example 4 was prepared by the following method. First, a commercially available carbon nanotube powder having an average particle size of 20 nm (hereinafter, also referred to as a "carbon nanotubes" including powders described in Table 2) was provided as a raw material used in place of the heat-treated carbon powder of each of Examples 1 to 11.

The carbon nanotube powder was then placed in a capsule made of a high-melting-point metal, and held at a temperature and pressure as shown in Table 2 for 20 minutes using an ultra-high-pressure and high-temperature generator, so that the carbon nanotube powder was converted into diamond, and sintered. In this way, the polycrystalline diamond body of Comparative Example 4 was obtained.

Comparative Example 5

A sintered diamond body of Comparative Example 5 was prepared by the following method. First, a diamond powder and Co-based metal binding material powder having an average particle size of 2 μm (hereinafter, referred to as a "diamond powder/metal binding material powder" including powders described in Table 2) was provided as a raw material used in place of the heat-treated carbon powder of each of Examples 1 to 11.

The diamond powder/metal binding material powder was then placed in the capsule, and held at a temperature and pressure as shown in Table 2 for 20 minutes using an ultra-high-pressure and high-temperature generator, so that the diamond powder/metal binding material powder was sintered. In this way, the sintered diamond body of Comparative Example 5 was obtained.

<<Evaluation>>

The composition, particle size, Knoop hardness and ratio b/a in the Knoop indentation for each of the polycrystalline diamond bodies of Examples 1 to 11 and Comparative Examples 1 to 4 and the sintered diamond body of Comparative Example 5 as obtained in the manner described above were measured by the following method.

<Composition>

The composition and contents (% by volume) of diamond and graphite contained in each of the polycrystalline diamond bodies of Examples 1 to 11 and Comparative Examples 1 to 4 and the sintered diamond body of Comparative Example 5 were measured and identified under the above-described conditions using an X-ray diffractometer (trade name: "X'pert", manufactured by Spectris). That is, the ray source of the X-ray of this apparatus was Cu, and the X-ray was a Kα ray with a wavelength of 1.54 angstroms. The results are shown in the column of "composition" in Table 2. In Comparative Example 5, the composition of each carbon allotrope was calculated without considering the content (% by volume) of the metallic binding material in the sintered diamond body.

Further, the content of impurities was measured for each of the polycrystalline diamond bodies of Examples 1 to 11 and Comparative Examples 1 to 4 by the above-described method using SIMS. Since the sintered diamond body of Comparative Example 5 contained a metallic binding material in the sintered body, analysis by SIMS was not performed. Resultantly, in each of the polycrystalline diamond bodies of Examples 1 to 11 and Comparative Examples 1 to 3, the content of impurities was less than or equal to 800 ppma for hydrogen, less than or equal to 200 ppma for nitrogen, and less than or equal to 30 ppma for oxygen. The polycrystalline diamond body of Comparative Example 4 contained greater than or equal to 3000 ppma of hydrogen as an impurity.

<Particle Size>

The average particle size of diamond contained in each of the polycrystalline diamond bodies of Examples 1 to 11 and Comparative Examples 1 to 4 and the sintered diamond body of Comparative Example 5 was determined using a TEM image or SEM image of a cross-section of the polycrystalline body or the sintered body. In the polycrystalline diamond bodies of Examples 1 to 11 and Comparative Examples 2 and 4, the magnification in the TEM was set to 200000. This is because at a magnification of less than 200000, the number of crystal grains appearing within one visual field is too large to calculate an accurate average particle size. In addition, at a magnification of more than 200000, the number of grains in a circle is too small to calculate an accurate average particle size. However, in the polycrystalline diamond bodies of Comparative Examples 1 and 3, the magnification in the SEM was set to 50000 because of these polycrystalline diamond bodies had a large particle size. In the sintered diamond body of Comparative Example 5, the magnification in the SEM was set to 3000 because the sintered diamond body had a larger diamond particle size as compared to the polycrystalline diamond bodies of Comparative Examples 1 and 3.

Further, for each of examples and comparative examples, three TEM images (or SEM images) were obtained by photographing different portions of one sample, the average particle size was determined by the above-described method for each of the TEM images (or SEM images), and the average of the three determined average particle sizes was defined as an average particle size. The results are shown in the column of "average particle size" in Table 2.

<Knoop Hardness and Ratio b/a in Knoop Indentation>

For each of the polycrystalline diamond bodies of Examples 1 to 11 and Comparative Examples 1 to 4 and the sintered diamond body of Comparative Example 5, the Knoop hardness and the ratio b/a in the Knoop indentation were measured under the following conditions.

Specifically, as a Knoop indenter, a micro-Knoop indenter (dihedral angle: 172.5° and 130°, diagonal line length ratio of rhombic bottom surface: 1: 7.11) was used, and the Knoop hardness was measured five times under a test load of 4.9 N at 23° C.±5° C. The average of three values remaining after excluding the smallest value and the largest value from the results of the five measurements was determined, and defined as a Knoop hardness in each of examples and comparative examples. The results are shown in the column of "Knoop hardness" in Table 2.

Further, for each measurement, the ratio b/a of the length b of the shorter diagonal line with respect to the length a of the longer diagonal line of the Knoop indentation was measured using a laser microscope (trade name: "ols 3000", manufactured by Olympus Corporation), and the average thereof was defined as a ratio b/a in the Knoop indentation. The results are shown in the column of "ratio b/a" in Table 2. For the Knoop indentation, the average of three values remaining after excluding the smallest value and the largest value from the results of five measurements was determined.

As shown in Table 2, the average particle size of diamond in each of Examples 1 to 11 was 3 to 15 nm. Here, the Knoop hardness was 98 to 135 GPa and the Knoop ratio b/a was 0.035 to 0.050 in each of Examples 1 to 11. From this result, it was found that the polycrystalline diamond bodies of Examples 1 to 10 had fine structures, and were tough. In particular, in each of Examples 1 to 9 and 11, the Knoop hardness was greater than or equal to 100 GPa, and with consideration also given to the results of the average particle size of diamond and the ratio b/a in the Knoop indentation, it was found that the polycrystalline diamond body was tougher.

On the other hand, in Comparative Example 1, diamond had an average particle size of 50 nm, which was larger than that in each of Examples 1 to 11, and the ratio b/a in the Knoop indentation was 0.060, indicating that elastic recovery was smaller as compared to Examples 1 to 11.

In Comparative Example 2, graphite serving as heat-treated carbon was not converted into diamond, and was contained in the polycrystalline diamond body in an amount of more than 0.1% by volume. In addition, in Comparative Example 2, the ratio b/a in the Knoop indentation was 0.098, indicating that elastic recovery was smaller as compared to Examples 1 to 11.

In Comparative Example 3, a coarse graphite powder having an average particle size of 5 μm was used as a raw material, and the diamond in the polycrystalline diamond body had an average particle size of 70 nm, which was larger than that in each of Examples 1 to 11. In Comparative Example 3, the ratio b/a in the Knoop indentation was 0.065, indicating that elastic recovery was smaller as compared to Examples 1 to 11.

In Comparative Example 4, carbon nanotubes having an average particle size of 20 nm were used as a raw material, and the diamond in the polycrystalline diamond body had an average particle size of 8 nm, which was comparable to that in each of Examples 1 to 11. In Comparative Example 4, the ratio b/a in the Knoop indentation was 0.055, indicating that elastic recovery was smaller as compared to Examples 1 to 11. Carbon nanotubes are generated from a hydrogen-containing gas, and therefore contains a large amount of hydrogen in production. Thus, it was considered that since the raw material used here contained greater than or equal to 3000 ppma of hydrogen in SIMS analysis, the strength of the grain boundary of diamond was reduced.

In Comparative Example 5, a diamond powder and a binding material were used as raw materials, the ratio b/a in the Knoop indentation was 0.111, indicating that elastic recovery was smaller as compared to Examples 1 to 11.

<<Cutting Performance>>

Each of the polycrystalline diamond bodies of Examples 1 to 11 and Comparative Examples 1 to 4 and the sintered diamond body of Comparative Example 5 was attached to the tip of a ball end mill tool having a tip diameter of 0.5 mm, and cutting performance was evaluated. Specifically, an ultra-hard alloy containing 12% by mass of cobalt (Co) was provided as a material to be cut, and the material to be cut was cut by 24 m under conditions of a rotation speed of 60,000 rpm, a cutting speed of 120 mm/min, a cutting amount of 5 μm and a feeding amount of 5 μm. The wear amount of the tool at the end of cutting is shown in Table 3 as a relative ratio of the wear amount (hereinafter, tool wear relative ratio) in each of examples and comparative examples to the wear amount in Example 1. The polycrystalline diamond body and the sintered diamond body can be considered to become tougher as the tool wear relative ratio decreases.

TABLE 3

| | Tool wear relative ratio |
|---|---|
| Example 1 | 1 |
| Example 2 | 1.2 |
| Example 3 | 2 |
| Example 4 | 2 |
| Example 5 | 2 |
| Example 6 | 1.8 |
| Example 7 | 1.8 |
| Example 8 | 1.6 |
| Example 9 | 1.4 |
| Example 10 | 2 |
| Example 11 | 1.6 |
| Comparative Example 1 | 10 |
| Comparative Example 2 | Blade edge is significantly chipped, and processing is stopped. |
| Comparative Example 3 | 15 |
| Comparative Example 4 | Blade edge is significantly chipped, and processing is stopped. |

TABLE 3-continued

| | Tool wear relative ratio |
|---|---|
| Comparative Example 5 | 20.5 |

The tool wear relative ratio in Examples 1 to 11 was 1 to 2. On the other hand, in Comparative Examples 2 and 4, the tool was significantly chipped at cutting lengths of 15 m and 10 m, respectively, and processing was stopped. In addition, the tools of Comparative Examples 1, 3 and 5 had tool wear relative ratios of 10, 15 and 20.5, respectively, and were thus more significantly worn as compared to the tools of Examples 1 to 11. Thus, the polycrystalline diamond bodies of Examples 1 to 11 were confirmed to be tougher than the polycrystalline diamond bodies of Comparative Examples 1 to 4 and the sintered diamond body of Comparative Example 5.

While embodiments and examples of the present invention have been described above, it is conceived from the beginning that the configurations of the embodiments and examples are appropriately combined, or variously modified.

The embodiments and examples disclosed herein should be construed to be illustrative in all respects, and nonrestrictive. The scope of the present invention is given by claims rather than the above-described embodiments and examples, and intended to include meanings equivalent to claims, and all changes within the scope of claims.

The invention claimed is:

1. A polycrystalline diamond body comprising diamond, wherein
   the diamond has an average particle size of less than or equal to 15 nm,
   a ratio b/a of a length b of a shorter diagonal line with respect to a length a of a longer diagonal line of a Knoop indentation is less than or equal to 0.05 in Knoop hardness measurement with a test load of 4.9 N at 23° C.±5° C.,
   a content of diamond in the polycrystalline diamond body is more than or equal to 99.5% by volume,
   a content of impurities in the polycrystalline diamond body is less than or equal to 800 ppma for hydrogen, less than or equal to 200 ppma for nitrogen, and less than or equal to 30 ppma for oxygen, and
   in the Knoop hardness measurement, a Knoop hardness is greater than or equal to 100 GPa and less than or equal to 140 GPa.

2. A cutting tool comprising the polycrystalline diamond body according to claim 1.

3. A wear-resistance tool comprising the polycrystalline diamond body according to claim 1.

4. A grinding tool comprising the polycrystalline diamond body according to claim 1.

5. A method for producing a polycrystalline diamond body according to claim 1, the method comprising:
   a first step of heat-treating a powder of high-pressure-phase carbon at higher than or equal to 1300° C. and lower than or equal to 2100° C. to obtain a heat-treated carbon powder which is a powder of ordinary-pressure-phase carbon after heat treatment; and
   a second step of sintering the heat-treated carbon powder under conditions of greater than or equal to 12 GPa and less than or equal to 25 GPa and higher than or equal to 1200° C. and lower than or equal to 2300° C. to obtain a polycrystalline diamond body, wherein the high-pressure-phase carbon includes at least one of diamond and hexagonal diamond, wherein
the powder of high-pressure-phase carbon has an average particle size of more than or equal to 50 nm and less than or equal to 10000 nm, and
the heat-treated carbon powder has an average particle size of more than or equal to 50 nm and less than or equal to 10000 nm.

\* \* \* \* \*